May 11, 1926.  
H. E. SCHMAUS  
1,584,195  
ENTRAPPING DEVICE FOR BANDITS OR ROBBERS  
Filed Oct. 12, 1925

Inventor  
Harold E. Schmaus  
By C. W. Clement  
Attorney

Patented May 11, 1926.

1,584,195

UNITED STATES PATENT OFFICE.

HAROLD E. SCHMAUS, OF MOUNT CARMEL, PENNSYLVANIA.

ENTRAPPING DEVICE FOR BANDITS OR ROBBERS.

Application filed October 12, 1925. Serial No. 62,107.

This invention relates to a device for entrapping burglars, bandits, hold ups, in case of an attempted robbery of a bank, vault or safe and is so arranged that the attacking party is deposited in a cell or cage in the basement beneath.

The various features of the invention will be more fully described in connection with the accompanying drawing, in which:—

Figure 1:
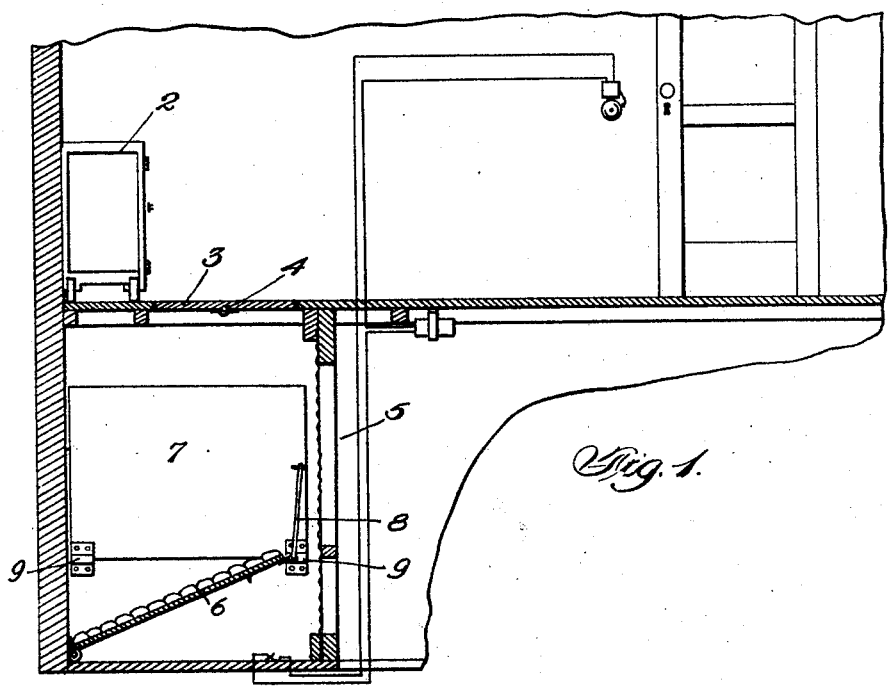
Figure 1 is a horizontal sectional view of a bank or other structure in which there may be a vault, or safe showing the entrapping device beneath.
Figure 2:
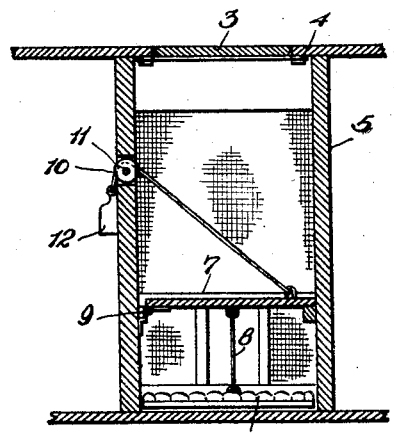
Figure 2 is a vertical sectional view of the entrapping device closed.
Figure 3:
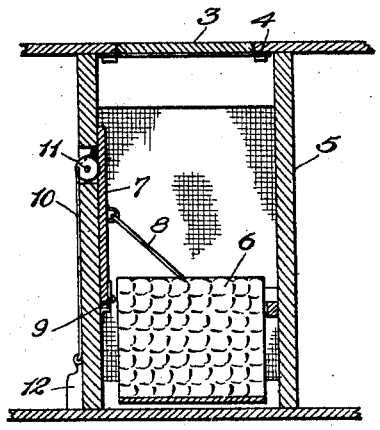
Figure 3 is a vertical sectional view of the entrapping device opened.

Referring to the drawing, 1 indicates a banking or other room in which there is a vault or safe 2. Directly in front of the safe 2 is a hinged or tiltable section of the floor 3 hinged at 4. Beneath the vault or safe 2 and the section of the floor 3 is a cage 5, in which is a movable floor 6, said floor being connected to a trap door 7 by rods 8. The trap door 7 is hinged at 9 and near its top a rope 10 is secured to it, said rope passing around pulley 11, and on the end of said rope is a weight 12. The lower part of the trap is cushioned or padded so that the one falling therein will not receive bodily injuries. The movable floor upon falling to the bottom of the cage completes an electrical current which sounds an alarm.

The operation of the device is as follows: A bandit or robber who approaches the door of a safe or vault for the purpose of robbing the same will step upon the tiltable section of the floor his weight causing one side of said section to dip down causing the robber to be deposited into the cage beneath and upon falling on the movable floor his weight will cause the trap door to be lowered thus confining the bandit in the bottom of the cage.

What I claim as new and desire to secure by Letters Patent is:—

1. In an entrapping device, the combination with a tiltable section of a floor in front of the door of a safe or vault, a confining cage beneath said tiltable section, a movable floor in said cage, a hinged trap door connected to said movable floor, a rope and weight secured to said trap door.

2. In an entrapping device, the combination with a tiltable section of a floor in front of a safe or vault, a confining cage beneath said tiltable floor, a movable floor in said cage, a hinged trap door connected to said movable floor adapted to be lowered by a body deposited on said movable floor, a weight connected to said trap door by means of a rope adapted to hold said trap door in upright position when the movable floor is moved upward.

In testimony whereof I affix my signature.

HAROLD E. SCHMAUS.